United States Patent [19]
Thomas

[11] Patent Number: 5,954,386
[45] Date of Patent: Sep. 21, 1999

[54] SUN GUARD

[76] Inventor: James P. Thomas, 14 Birdie La., Flying Hills, Pa. 19607

[21] Appl. No.: 08/643,180

[22] Filed: May 6, 1996

[51] Int. Cl.⁶ ........................................................ B60J 3/02
[52] U.S. Cl. .......................... 296/97.2; 296/97.6; 359/614
[58] Field of Search ................................ 296/97.2, 97.6; 359/601, 614

[56] References Cited

U.S. PATENT DOCUMENTS

| | | |
|---|---|---|
| 1,982,511 | 11/1934 | Geist . |
| 1,990,143 | 2/1935 | Snow ........................................ 359/614 |
| 2,204,691 | 6/1940 | Olsen ...................................... 296/97.2 |
| 2,220,429 | 11/1940 | Soderberg .............................. 296/97.2 |
| 2,228,209 | 1/1941 | Harrington ............................. 296/97.8 |
| 2,458,125 | 1/1949 | Winkler . |
| 2,528,038 | 10/1950 | Crise ....................................... 359/888 |
| 2,715,043 | 8/1955 | Schewel .............................. 359/614 X |
| 2,733,763 | 2/1956 | Nygaard .............................. 296/97.8 X |
| 3,383,132 | 5/1968 | Stamp .................................... 296/97.5 |
| 3,475,080 | 10/1969 | Shumway ............................... 296/97.2 |
| 3,512,880 | 5/1970 | Alexander et al. ...................... 359/614 |
| 4,045,125 | 8/1977 | Farges ................................. 359/614 X |
| 4,105,304 | 8/1978 | Baker . |
| 4,279,463 | 7/1981 | Little . |
| 4,323,275 | 4/1982 | Lutz . |
| 4,528,232 | 7/1985 | Cliffe ...................................... 428/195 |
| 4,673,248 | 6/1987 | Taguchi et al. ......................... 350/166 |
| 4,746,162 | 5/1988 | Maness ............................... 296/97.2 X |
| 4,826,286 | 5/1989 | Thornton, Jr. . |
| 4,874,195 | 10/1989 | Lu et al. ................................. 296/97.2 |
| 4,943,140 | 7/1990 | Woodard et al. ........................ 350/164 |
| 4,952,459 | 8/1990 | Thatcher ................................. 428/426 |
| 4,978,160 | 12/1990 | Welschoff ............................. 296/97.8 |
| 4,988,139 | 1/1991 | Yamada ................................ 296/97.2 |
| 5,020,533 | 6/1991 | Hubbard et al. ................... 128/206.23 |
| 5,022,701 | 6/1991 | Thompson, II .......................... 296/152 |
| 5,139,879 | 8/1992 | Aharoni et al. ......................... 428/422 |
| 5,150,703 | 9/1992 | Hubbard et al. ................... 128/206.12 |
| 5,162,145 | 11/1992 | Schaefer ................................. 428/209 |
| 5,178,955 | 1/1993 | Aharoni et al. ......................... 428/421 |
| 5,225,244 | 7/1993 | Aharoni et al. ......................... 427/240 |
| 5,297,353 | 3/1994 | Ghalayini .................................. 40/503 |
| 5,332,618 | 7/1994 | Austin ..................................... 428/216 |
| 5,400,174 | 3/1995 | Pagis et al. ............................. 359/359 |
| 5,513,892 | 5/1996 | Thomas .................................. 296/97.2 |

FOREIGN PATENT DOCUMENTS

| | | | |
|---|---|---|---|
| 2578791 | 9/1986 | France ................................... 291/97.6 |
| 1 480 584 | 9/1969 | Germany . |
| 24 49 824 | 4/1976 | Germany . |
| 64-63420 | 3/1989 | Japan ..................................... 296/97.2 |
| 3-239629 | 10/1991 | Japan . |
| 328554 | 4/1930 | United Kingdom . |

OTHER PUBLICATIONS

LLUMAR Auto Film, AT-5 S PS, Brochure, two pages.
Polaroid Corporation Polarizer Division, Polarized Glare Shield Brochure, One page.

*Primary Examiner*—Dennis H. Pedder
*Attorney, Agent, or Firm*—Robert E. Bushnell, Esq.

[57] ABSTRACT

A sun guard for a vehicle may be constructed with a darkly tinted transparent acrylic shield to enable a vehicle occupant to comfortably view objects such as a traffic light even while the sun is within nearly the same line of vision, eliminating blinding glare by inhibiting the direct transmission of sunlight to a substantially uniform average of about two to three percent across the visible spectrum. A lighter tinted shield may alternatively be provided with a dark window film covering a major surface of the shield to provide similar visible light transmission characteristics. A clip having at least one double clamp spring pivotally attaches the sun guard to an existing opaque sun visor.

21 Claims, 12 Drawing Sheets

SUN GUARD

BACKGROUND OF THE INVENTION

1. Field of the Invention

The present invention relates to improvements in automobile sun visors and more particularly, to a composition and article of manufacture providing a particular reduction in transmission of light across the spectrum of electromagnetic energy radiated by the sun and impingent upon the operator of a vehicle.

2. Description of the Prior Art

Automobile sun visors serve to shade the eyes of a vehicle occupant from destructive components of visible light, primarily glare produced by direct or reflected sunlight. Generally, automobile sun visors consist of an opaque, completely non-transmissive sheet material positioned between the occupant of the automobile and the sun light directed toward the occupant's eyes. Nearly all automobile sun visors are pivotable so they can be rotated away from the occupant's line of vision, if the occupant desires.

Many attempts have been made to modify the general form of the automobile visor made of either an inorganic oxide such as glass, or of a plastic, to assist a vehicle occupant in reducing glare, defined herein as harsh, uncomfortably bright light resulting from an intense source of electromagnetic radiation, principally within the visible spectrum.

Externally applied extensions have been produced to increase the effective area of an automobile sun visor. One of the earlier efforts is found in the *Sun Visor Extension For Vehicle* issued to Barnhart (U.S. Pat. No. 3,853,370), which shows a sun visor extension for vehicles. This extension uses a clamping base designed to attach to an automobile sun visor, with a retractable and extendable sheet forming a visor attached to the clamping base. This sun visor extension allows an occupant to effectively increase the size of an existing automobile sun visor by extending the visor sheet. A transparent or opaque visor sheet fabricated from a colored or tinted plastic material is said to be preferred in order to shade an occupant's eyes when the sun is low on the horizon, although I have discovered that type of visor fails to provide protection that is satisfactory to most motorists.

Another design is found in the *Extension Unit For Sun Visor*, issued to Karford (U.S. Pat. No. 4,792,176), which shows an extension unit for a sun visor. This extension unit includes two shields and is externally applied to an automobile sun visor. One shield is opaque and may be extended in a horizontal direction to block irritating light from obliquely entering an occupant's eyes. The other shield may be either tinted, polarized or completely opaque, and may be extended and retracted in the vertical direction to block the passage of light from entering an occupant's eyes or to reduce glare, depending upon whether the shield is constructed of tinted, polarized or completely opaque material.

The *Sun Glass Attached To Sun Visor* of Nakata (Japanese patent 64-63420), briefly mentions an accessory to an automobile sun visor which is electrically or manually controlled and slidably or turnably attached to the visor. The accessory is made from one of either colored glass, a colored plastic board, glass with a film attached to one surface of the glass, or a plastic board with a film s attached to one surface of the plastic board. Other efforts, such as the slidably adjustable extension glare screen found in the *Automobile Sun Shield* of U.S. Pat. No. 4,978,160 issued to H. Welschoff, or in the *Sun Visor For Vehicles* of U.S. Pat. No. 2,228,209 issued to C. C. Harrington, rely upon a rectangular translucent panel of any suitable material and teach nothing more than Celluloid, Cellophane and colored silk as suitable translucent materials. I have found that the performance of this type of device is less than acceptable.

Although these and other designs for automobile visors have been attempted over the past several decades, I have discovered that they have many drawbacks and do not adequately address problems attributable to sun glare and problems caused when the sun is either within the driver's field of view or is directly within a driver's line-of-sight. I have become aware of the difficulty in intelligibly distinguishing traffic signals, pedestrians, and other vehicles in the direction of travel when the sun is low on the horizon and within the same line of sight as the other vehicles. Lighted traffic signals in substantially the same line of sight as the sun are particularly difficult to see and even more difficult to watch in order to timely distinguish either their visual message or changes in that visual message, even through a conventional tinted visor. I have found that comparable difficulties are encountered by aircraft pilots. Conventional designs for opaque sun visors typically supplied by a vehicle manufacturer, or opaque extension units, completely block the direct transmission of sunlight to the occupant's eyes, but the consequent narrowing of the driver's field of view and concomitant obstruction of the drivers view of nearby objects often results in a grave risk of collision when the vehicle strikes an object hidden by such opaque sun visors. I have found that light filters permanently incorporated into a windshield are limited by Federal law to a minimum of seventy percent (70%) luminance transmission and are restricted to the lesser of the portion of the windshield above the AS1 line or the top five inches, providing little benefit when the sun is near the horizon. I have also found that conventional tinted visors only slightly moderate the blinding effect created when the sun is near the horizon, failing to eliminate glare caused by direct and reflected transmission of visible sunlight into the eyes of the operator of a vehicle sufficiently to permit the operator to comfortably view nearby objects.

SUMMARY OF THE INVENTION

Accordingly, it is an object of the present invention to provide an improved optical sun guard.

It is another object to provide a sun guard able to either be attached to or to replace a vehicle's existing sun visor.

It is yet another object to allow the driver of a vehicle to visually focus on both stationary, moving and changing objects with his field of view while the sun is near the horizon and within the driver's field of vision, without suffering momentary impairment of vision.

It is still another object to provide a transparent material exhibiting less than five percent, preferably an average of three percent or less, and ideally an average of two percent or less, of luminous transmittance across the visible spectrum.

It is a further object to provide a device and process for enhancing vehicular navigability through intersections controlled by light emitting traffic signals.

These and other objects may be achieved with a sun guard constructed according to the principles of the present invention, which eliminates substantially all glare from visible sunlight directly transmitted into the eyes of the driver of a vehicle. In one embodiment, a shield of darkly tinted optically transparent material such as an acrylic plastic is constructed to transmit an average of three percent, or less, of sunlight across the visible spectrum, while still enabling light emitting traffic signals and the colors of those signals, as well as visible changes in those signals, to be observed and readily distinguished through the same portion of the shield.

According to another embodiment of a sun guard constructed according to the principles of the present invention, a shield of tinted optically transparent material such as an acrylic plastic sharply reduces the transmission of visible sunlight, and is covered by a dark film affixed to a major surface of the shield to transmit only a minimal portion of all sunlight within the visible wavelength spectrum impinging upon the film. In combination, the shield and film markedly attenuate glare caused by direct transmission of visible sunlight into the eyes of the driver of a vehicle, while still enabling light emitting traffic signals and the colors of those signals to be observed and distinguished through the shield.

The shield may be pivotally mounted to a clip utilizing a double clamp spring operating in two directions, for permitting stable attachment of the sun guard to existing visors having a range of thicknesses.

Other details, objects and advantages of the invention will become apparent as the following description of certain present preferred embodiments thereof, present preferred methods of manufacturing the invention, and a present preferred method of practicing the same.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
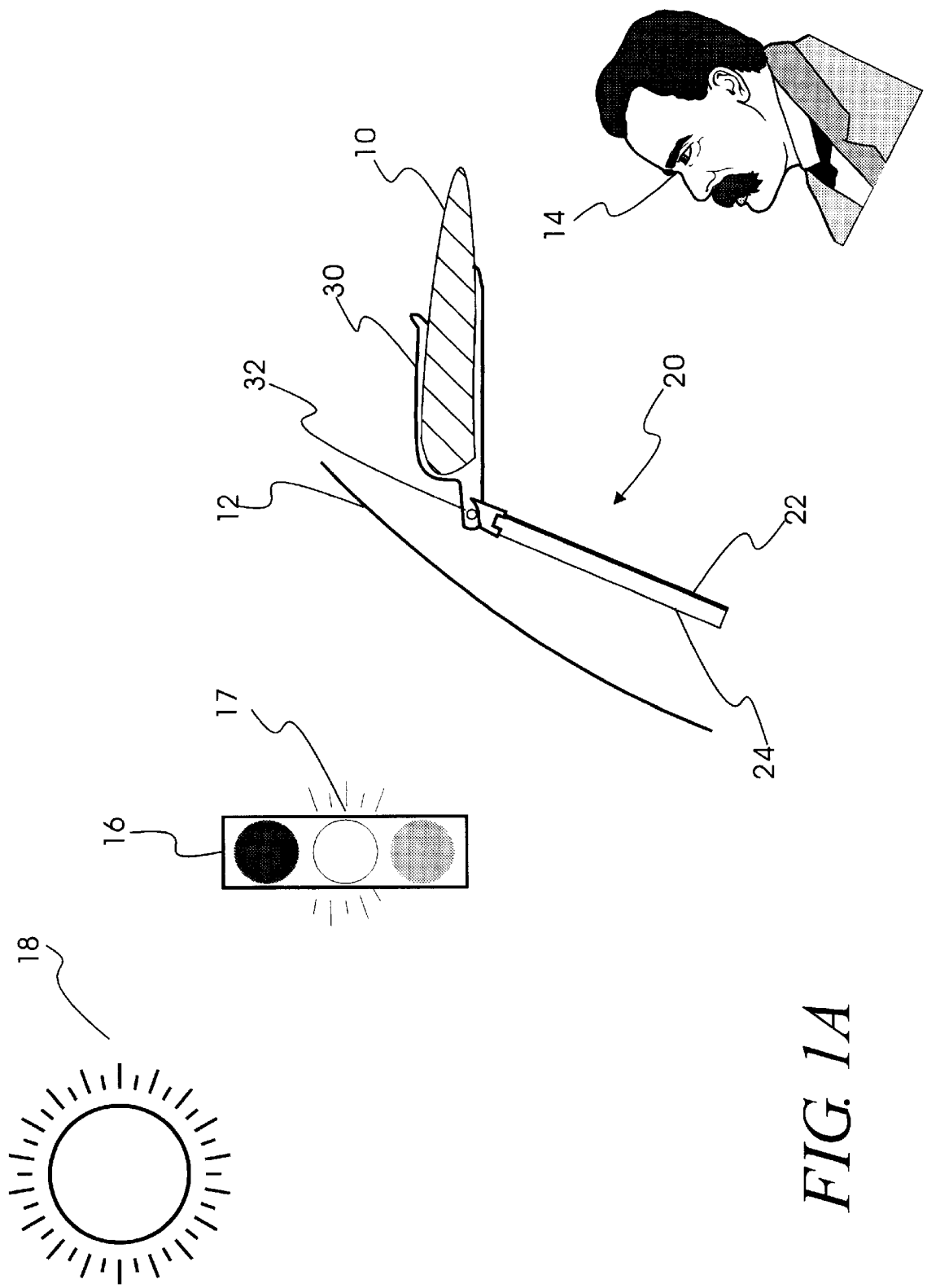
FIG. 1A is a diagram depicting a side view of one embodiment of the present invention showing its application while alignment exists between the sun and a lighted signal and the line of sight of a motorist.

Turning now to the drawings, and referring particularly to FIG. 1A, a conventional opaque automobile sun visor (e.g., a padded fabric shutter that is completely opaque and which blocks the motorist's view of and through windshield 12) is generally depicted by the reference numeral 10, typically fixed to an upper portion of a vehicle between the windshield 12 of the vehicle and the occupant's seat. A sun guard 20, having a darkly tinted shield 24 constructed as a generally flat, elongated plate with two flat and optically parallel major surfaces 26, 28 disposed across the field of view of the motorist, is configured to be capable of eliminating the blinding glare of the sun; sun guard 20 attached to the conventional visor 10 directly in the forward line of sight of a vehicle occupant 14 through windshield 12. The tinted shield 24 is pivotally mounted to a visor clip 30 using a hinge 32, to permit the shield 24 to be folded upwards against the conventional sun visor 10 when not in use.

In its intended mode of operation, an occupant of a vehicle 24 pivots the tinted shield 24 of sun guard 20 to a substantially vertical, or somewhat oblique position whenever the sun 18 is low enough in the sky to be visible through the windshield 12. In the practice of the present invention, transmission of external light is not completely inhibited, and a vehicle's occupant 14, typically the motorist operating the vehicle, may distinguish for example, the color of traffic lights 16 or other lighted signals through the tinted shield 24 and the location of the sun 18 without being blinded. The comparatively weak output from traffic lights is very difficult to distinguish after one's eyes have been blinded by, or have partially adjusted to, the painfully bright light directly transmitted from the sun 18, particularly when the sun is either within the same approximately 50° field of view or is directly behind the traffic light in approximate alignment with the line of sight of the motorist. By continuously inhibiting the overwhelming majority of visible sunlight from being directly transmitted to the motorist's eyes however, squinting or temporary utilization of the conventional opaque padded visor 10 need not occur, and the risk of misreading or failing to observe a traffic signal is minimized. When approaching or stopped by a traffic light 16 at an intersection, the occupant 14 can easily maintain continuous eye contact with the traffic light 16 through sun guard 20 for an extended period, as well as distinguish the color of the illuminated traffic light lens 17 and changes in the illuminated condition of lens 17 through tinted shield 24, even though the sun 18 is within the field of vision of the occupant 14 and positioned behind the traffic light 16. This feature provides a significant improvement in traffic navigability where the eyes of the motorists are exposed to direct or reflected sunlight, particularly at intersections controlled by traffic lights.

Figure 1B:
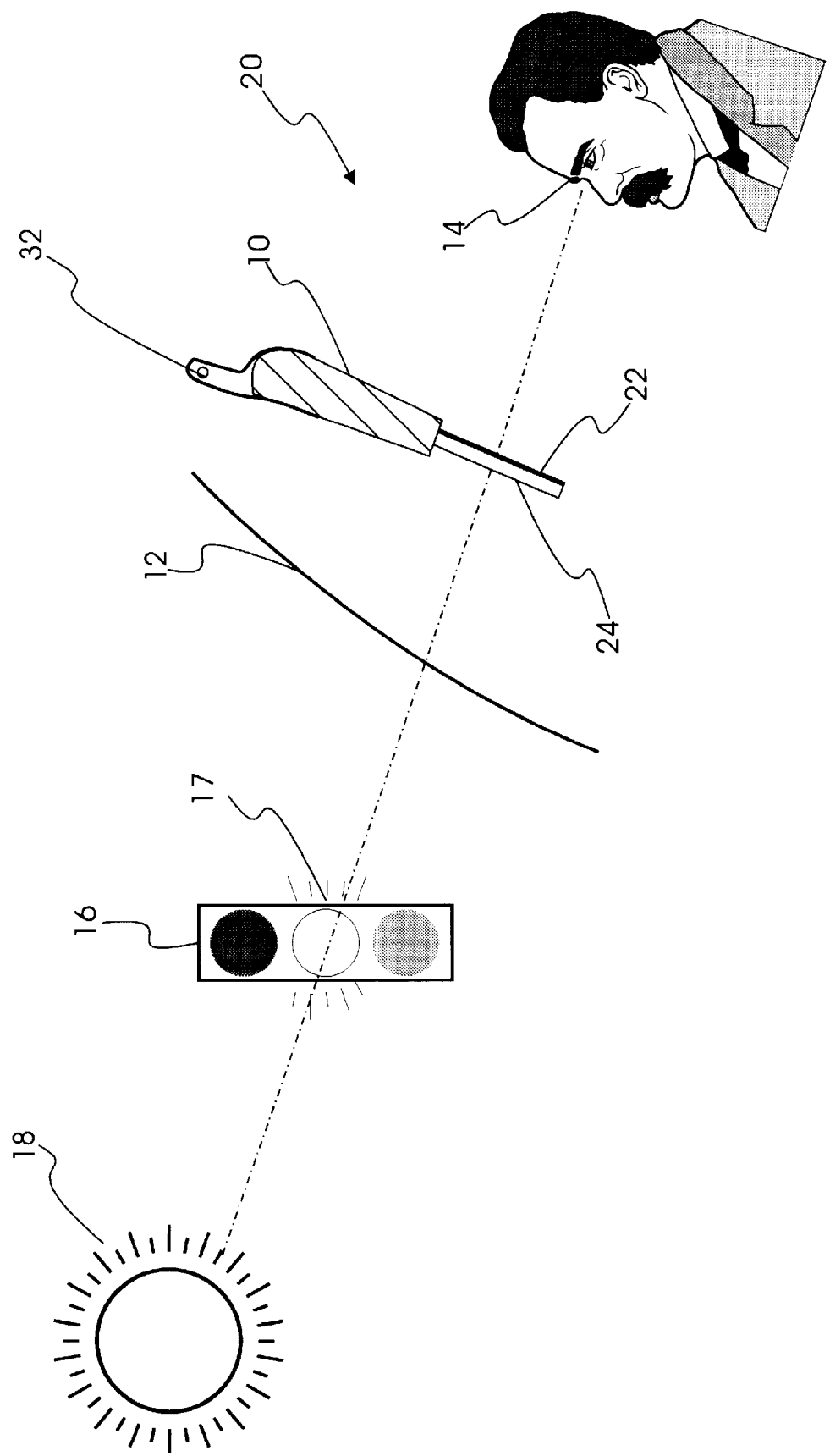
FIG. 1B is a diagram depicting a side view of an alternative embodiment of the present invention, showing its application while alignment exists between the sun, a lighted traffic signal and the line of sight of a motorist.

Turning now to FIG. 1B, an alternative embodiment is shown in which sun guard 20 may be constructed with shield 24 forming a lowermost portion of less than half of the vertical width of sun guard 20 either as the lowermost two inches, or perhaps the lowermost three inches of padded sun visor 10, or alternatively, as a slidable insert that may be drawn downwardly from a recess (not shown) within the interior of visor 10. In the latter construction, shield 24 may be withdrawn from visor 10 by varying distances, while visor 10 is in one of several downwardly extending positions, such as the one shown in FIG. 1B. Shield 24 may be constructed as a generally flat, elongated plate having two flat and optically parallel major surfaces 26, 28 through which the motorist's field of view extends to encompass objects such as the lit traffic signal 16, on the other side of windshield 12.

Figure 1C:
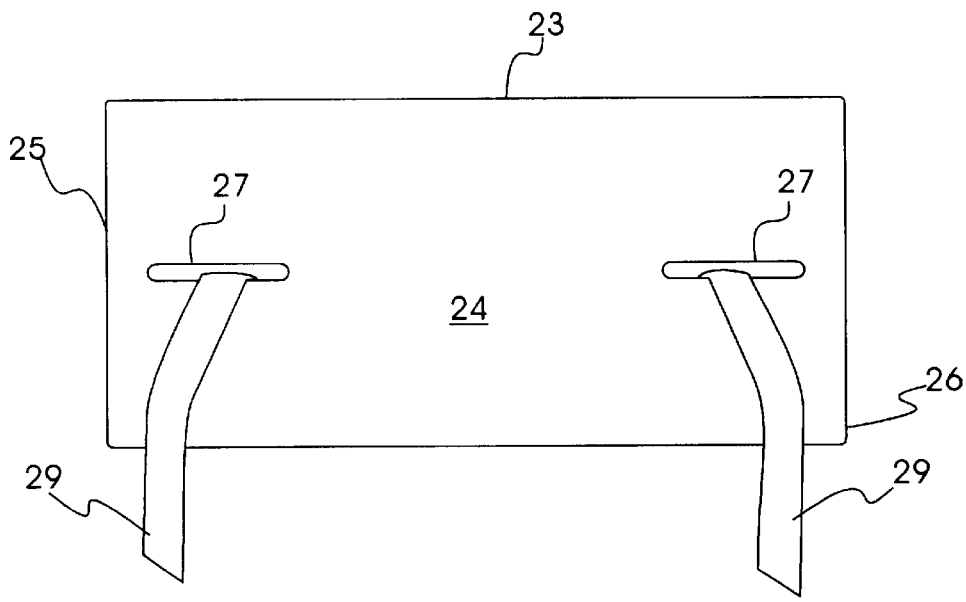
FIG. 1C is a plan view illustrating the details of construction of an alternative embodiment of the present invention.
Figure 1D:
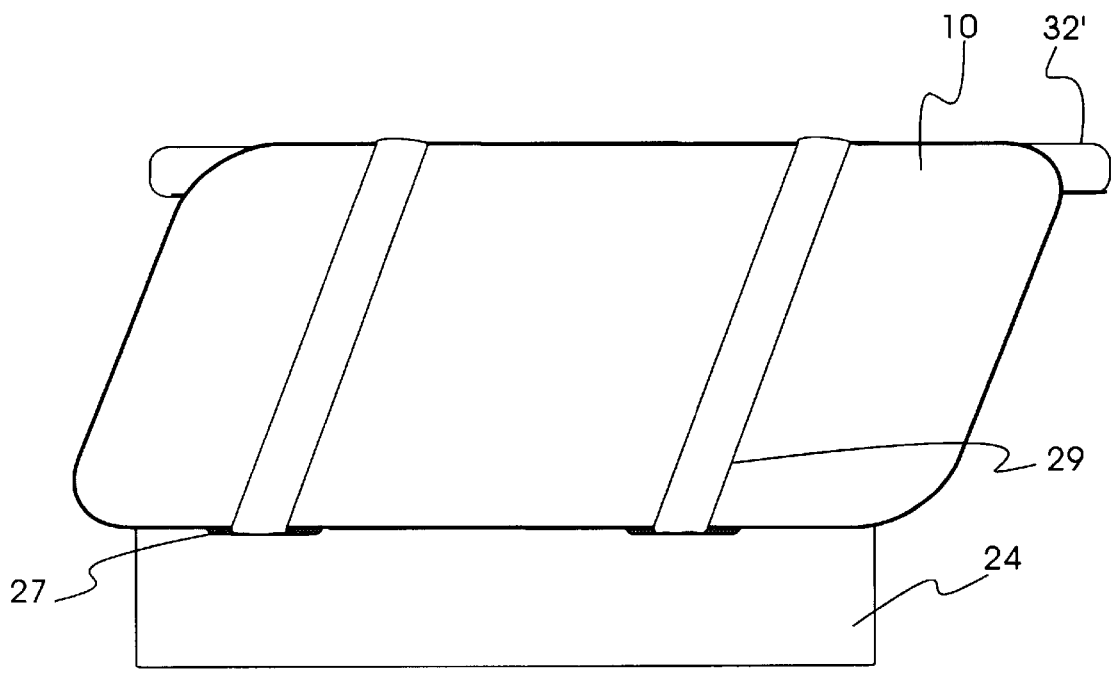
FIG. 1D is a plan view illustrating the mounting of the embodiment shown in FIG. 1C, upon a sun visor, while that embodiment is in use.

FIGS. 1C and 1D show an alternative construction enabling shield 24 to be mounted upon an existing opaque sun visor 10 such as the heavily padded visors that are becoming popular in late model motor vehicles, rotatably mounted within a vehicle by means of a hinge 32'. Shield 24 may be constructed as a rectangular plate of a dyed, or tinted, plastic resin having a thickness of less than one-half of one centimeter separating two optically parallel major surfaces 26. Two generally parallel major sides 23 are separated by two generally parallel minor sides 25. A pair of elongated through slots 27 are formed through horizontally opposite sides of shield 24, partially across the approximate center of shield 24, to enable fasteners such as belts (not shown) or strips of Velcro® 29 shown extending vertically across one side of an existing sun visor 10, to hold shield 24 against the lowermost edge of the sun visor 10 and to enable shield 24 to be pulled partially down below the lowermost edge of sun visor 10, as a motorist desires.

Figure 2:
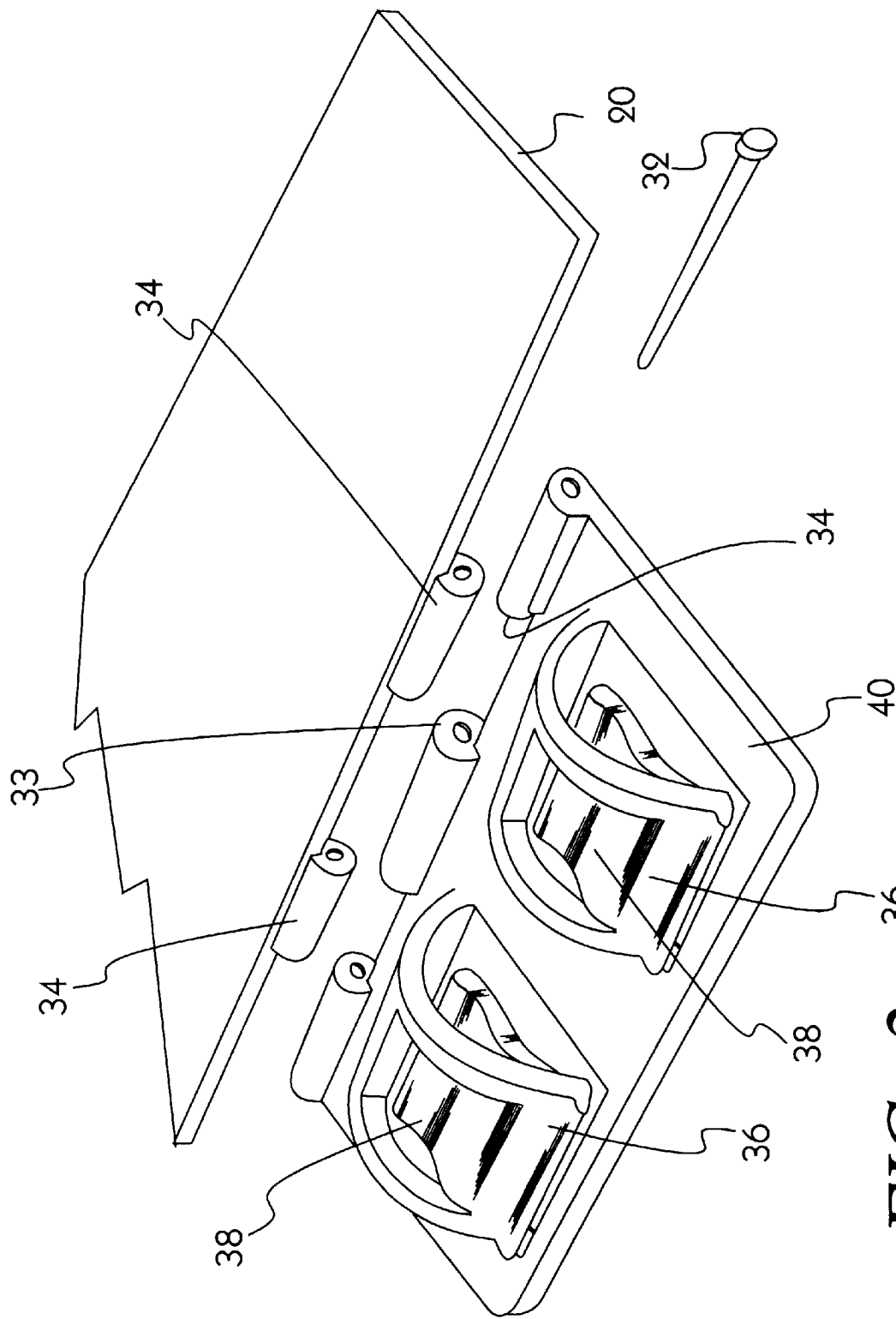
FIG. 2 is a perspective view depicting a sun guard and clip constructed according to one embodiment of the invention.

Turning now to FIGS. 2 through 6, a plastic or metal clip 30 is provided in one embodiment for attaching the sun guard 20 to the existing opaque sun visor found in most vehicles manufactured today. As shown in FIG. 2, hinge 32 utilizes a pivot pin 31 to provide a common axis for pivotally connecting individual extrusions 34 extending from adjacent edges of sun guard 20 and clip 30. Two laterally spaced primary clamps 36 are bent away from a flat lower jaw 40, to compress the body of a conventional sun visor 10 between primary clamp 36 and lower jaw 40 as the primary clamp 36 attempts to maintain its preformed shape.

Figure 4:
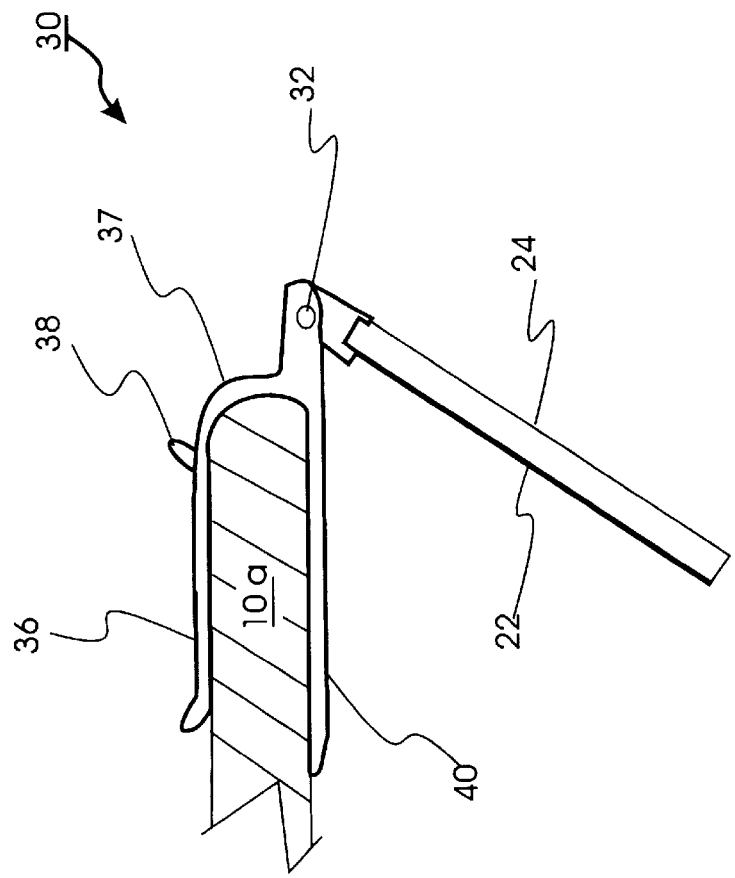
FIG. 4 is a side view depicting the sun guard and clip installed on a relatively thick vehicular sun visor.
Figure 3:
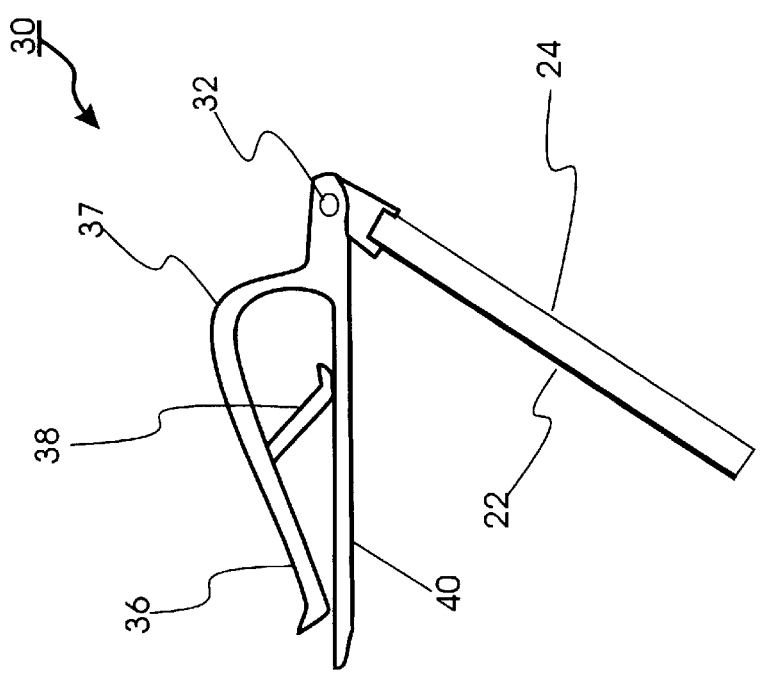
FIG. 3 is a side view of the sun glare shield and clip shown prior to attachment of the shield to a visor.
Figure 6:
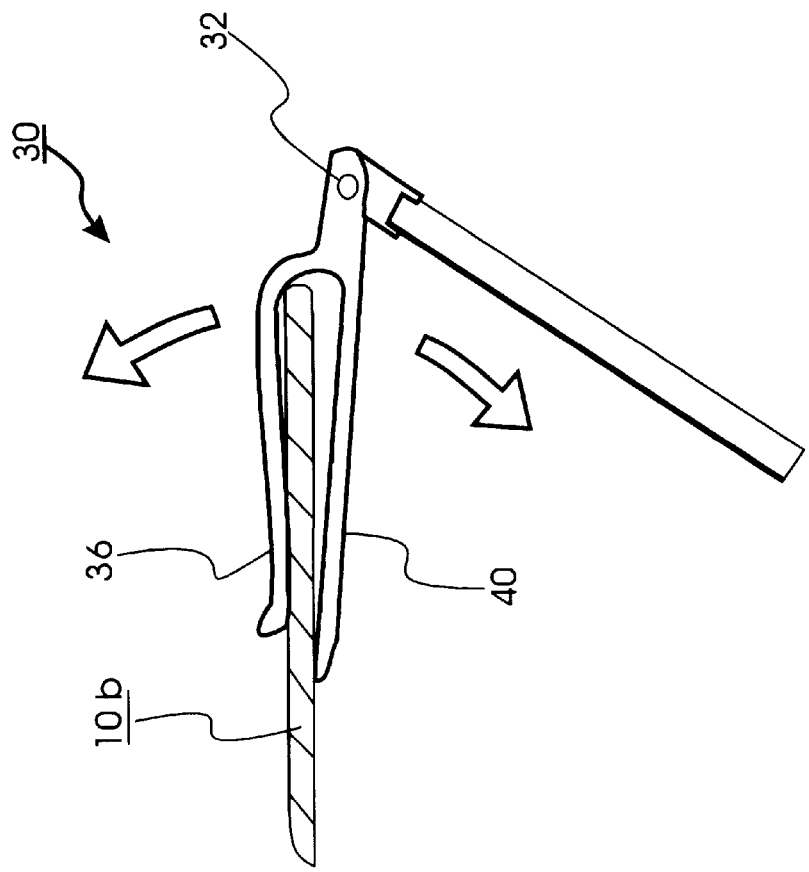
FIG. 6 is a diagram illustrating the instability of an inappropriately sized single clip.
Figure 5:
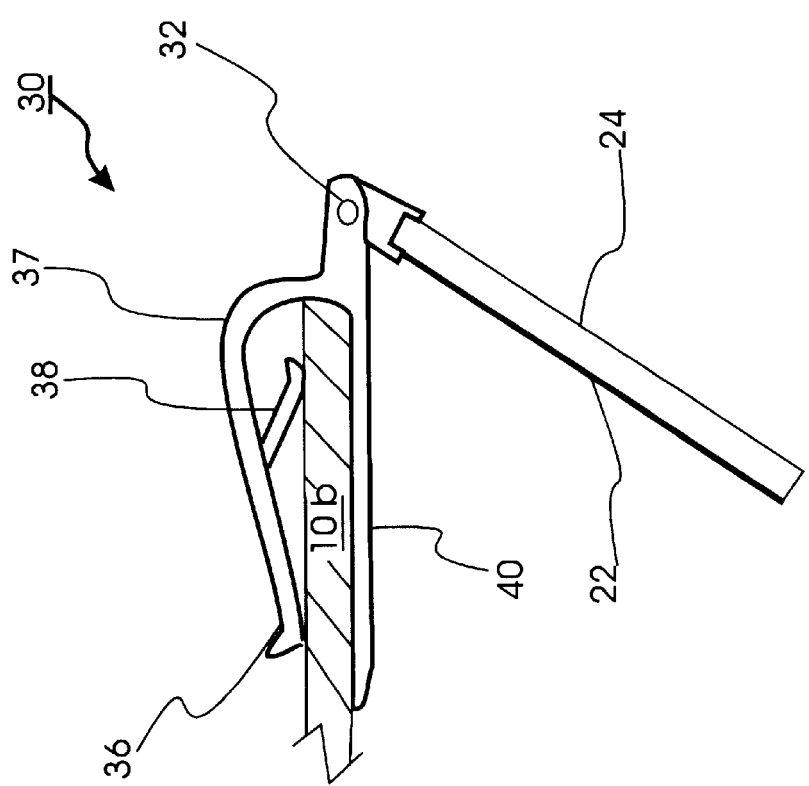
FIG. 5 is a side view depicting the sun guard and clip installed on a relatively thin vehicular sun visor.

As shown from the side in FIGS. 3 and 4, clip 30 is formed as an integral, monolithic structure constructed from flexible plastic or metal. A bend 37 in primary clamp 36 is spaced apart from lower jaw 40 by a distance only slightly less than the thickness of the most thickly padded visor 10a commonly available. In use, primary clamp 36 bends to accommodate thick visor 10a, but also presses forcibly against the visor due to a retained memory of the shape shown in FIG. 3. As illustrated in FIG. 6 however, when a primary clamp 36 alone is used with a relatively thin conventional visor 10b, the single clamping point near the middle of the visor permits the sun guard to rock up and down within the excess height provided by the bend 37 in the primary clamp 36 (shown in FIG. 6). Accordingly, clip 30 also includes a secondary clamp 38 extending from each primary clamp 36, but in an opposite direction relative to a free end of the primary clamp. Each secondary clamp 38 provides a second clamping point near the top of a thin visor 10b, to prevent rocking within the gap provided by bend 37 (shown in FIG. 5). When used with a thick visor 10b (shown in FIG. 4), the secondary clamp 38 is not necessary to prevent rocking, but serves to redistribute some of the force exerted by primary clamp 36. Otherwise, primary clamp 36 could exert sufficient pressure at the free end when fully extended by a visor of the maximum thickness, to damage the surface.

The visible spectrum is of particular interest in the present invention, constituting a range of wavelengths over which electromagnetic radiation output by the sun is detectable by human eyesight. Each visible color of light is typically associated with a particular band of wavelengths, ranging from a violet band of 400–450 nanometers at one end of the visible spectrum, through a blue band 450–490 nanometers, a green band of 490–550 nanometers, a yellow band of 550–580 nanometers, an orange band of 580–600 nanometers through a red band of 600–700 nanometers at the opposite end of the visible spectrum.

EXAMPLE 1

Shield 24 is constructed as a generally flat, elongated plate having two flat and optically parallel major surfaces 26, 28 through which the motorist's field of view extends to encompass objects on the other side of windshield 12. The substrate of shield 24 may be made as a single, unitary and monolithic structure, from a sheet of darkly tinted optical quality transparent acrylic resin such as methyl methacrylate with a tint that is configured to substantially impede light transmission to an average of less than about five percent. In particular embodiments, light transmission was impeded to an average of approximately three percent, or more desirably, of two percent or less than three percent across the visible spectrum, preferably exhibiting between less than about two percent average visible light transmission. Generally, clear methyl methacrylate provides transmission across the visible spectrum of about ninety-two percent, higher than silicon window glass. All colors of light should be transmitted to some degree and in a substantially uniform manner, defined herein as preferably not exceeding three times the average transmission for all bands of wavelengths within the visible spectrum. A substantially uniform filter should have a homogeneous generally grey or black colored visual appearance while viewed through a northern source of sunlight, objectively indicated by an absence of grossly disproportionate peaks or dips in a spectrophotometer reading. If a band of wavelengths is transmitted that is far out of proportion to the average percentage of transmission, objects viewed through the filter may incorrectly appear to have a corresponding color or no color at all, thereby reducing rather than improving driving safety. A transparent green material for example, could emphasize an unlit green lens of a traffic signal, while making a lit red lens appear dark.

The measurements made in the following examples were done using a spectrophotometer. The normally incident transmission measurements were done relative to air.

EXAMPLE 2

Figure 10:
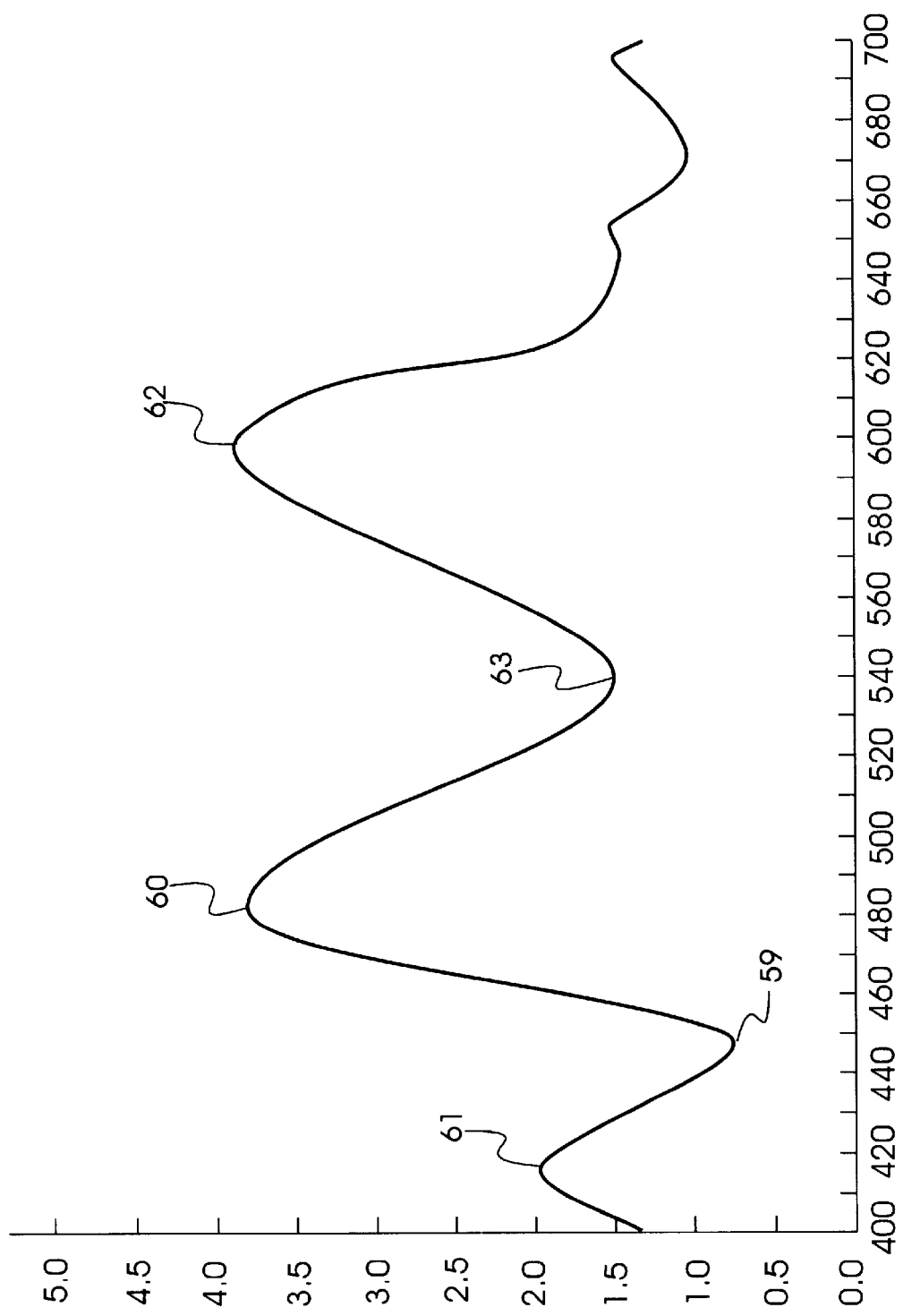
FIG. 10 is a two coordinate spectrophotometer graph showing measured values of light transmission as a function of wavelength across over the visible portion of the spectrum extending between 400 and 700 nanometers, for an acrylic plastic formulated according to the principles of the present invention.
Figure 11:
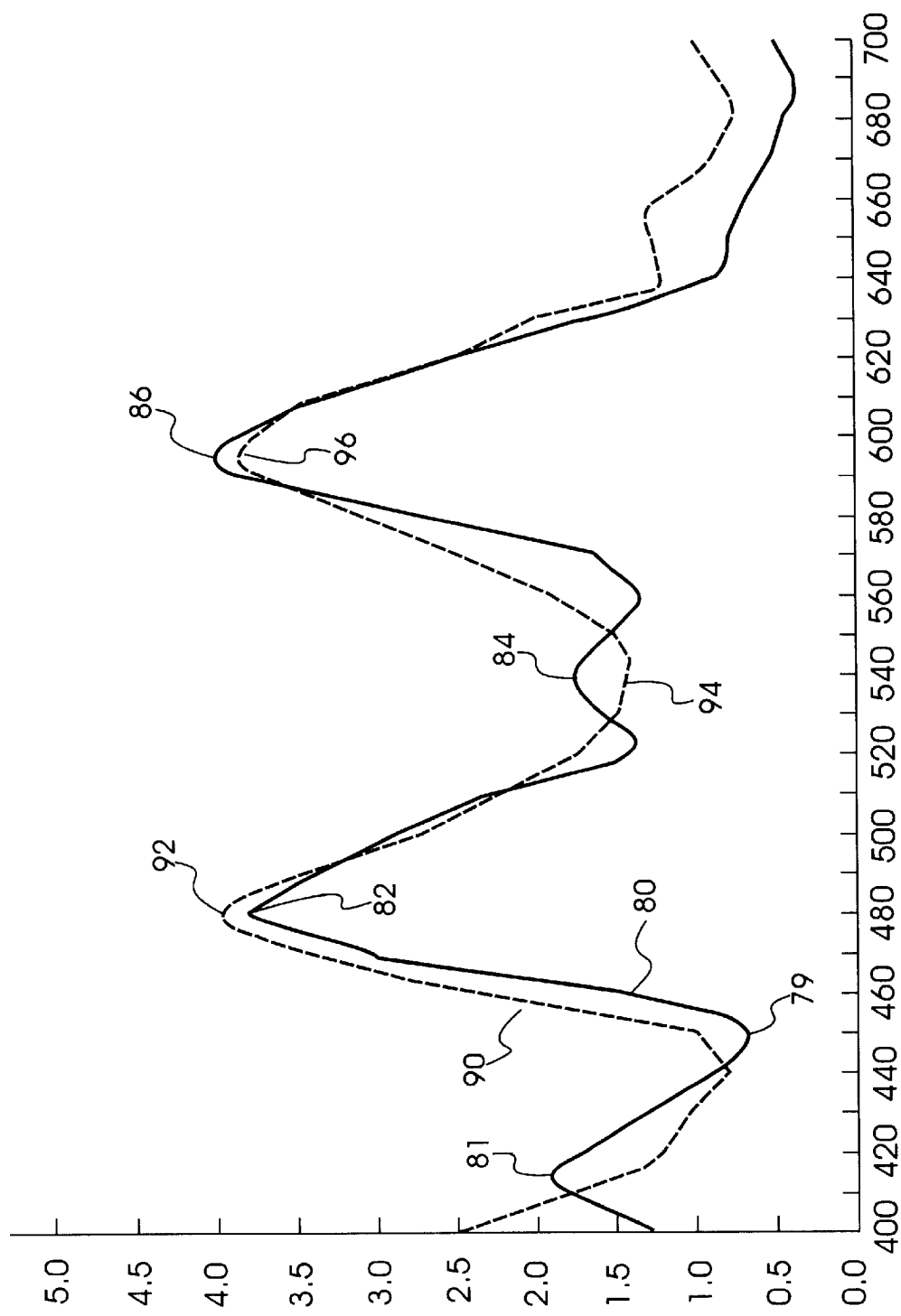
FIG. 11 is a two coordinate spectrophotometer graph showing measured values of light transmission as a function of wavelength across over the visible portion of the spectrum extending between 400 and 700 nanometers, for two different embodiments of the present invention.
Figure 12:
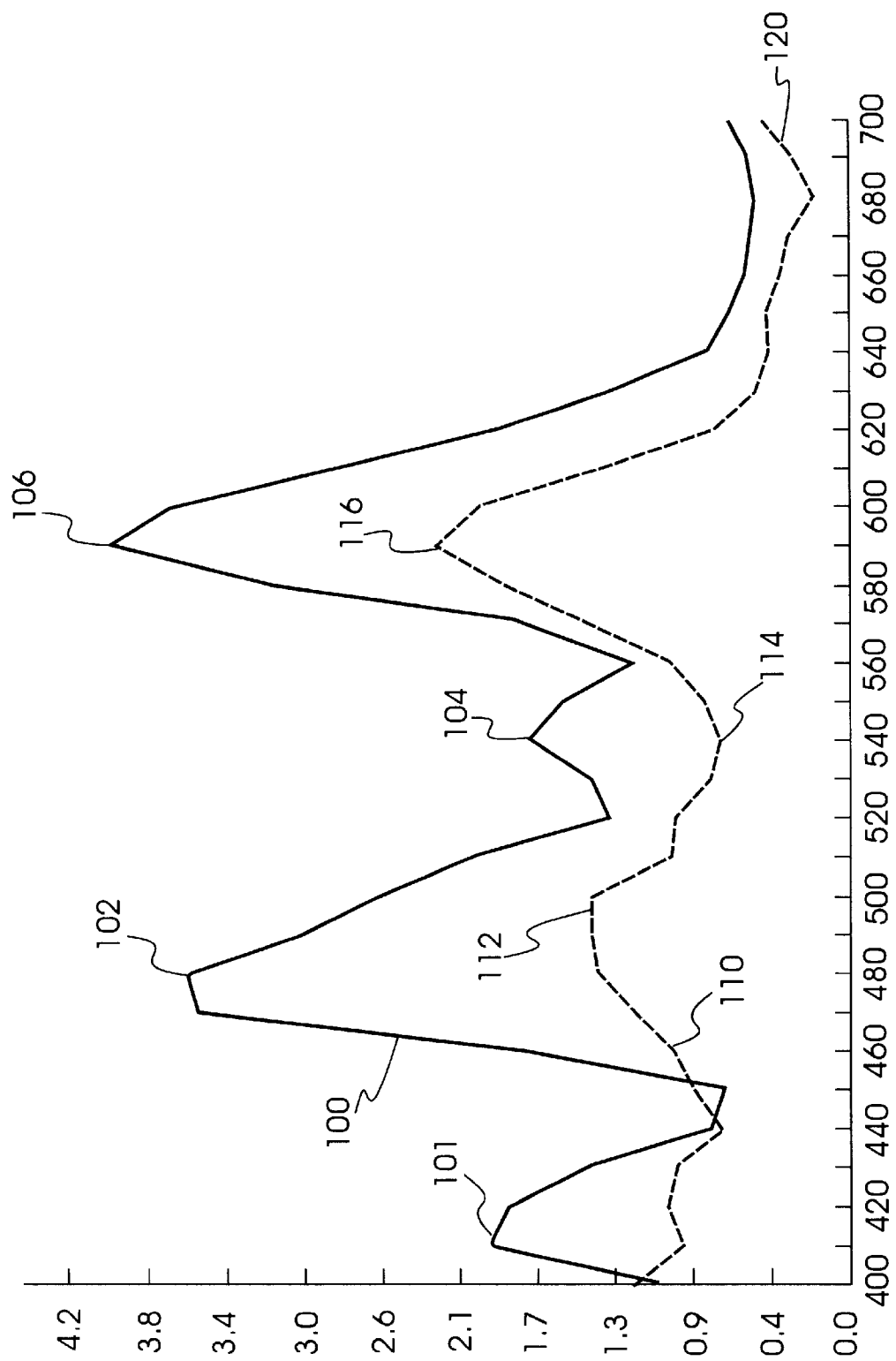
FIG. 12 is a two coordinate spectrophotometer graph showing measured values of light transmission as a unction of wavelength across over the visible portion of the spectrum extending between 400 and 700 nanometers, for two different embodiments of the present invention.

According to another embodiment of the present invention, sun guard 20 may be constructed with an overlapping tinted shield 24 forming a substrate and a band of darkly tinted window film 22 extending horizontally across the complete width of shield 24, preferably to completely and coextensively cover one major surface of shield 24, in order to provide a combined light transmission characteristic capable of eliminating sun glare as previously described. In this alternative embodiment, tinted shield 24 may advantageously be constructed from any of a number of commercially available colored acrylics resins or similar plastics preferably transmitting approximately one-fourth to one-half of visible sunlight impinging thereon. In this embodiment film 22 is preferably a dyed polyester or sputtered metal window film, selected from a group of films commonly referred to under the name "dark smoke", or "limo black" in reference to their common commercial use providing a black glass effect in automotive limousines, such as the type of film described in my U.S. Pat. No. 5,513,892 for a *Sun Glare Shield.* An adhesive backing affixes the film to one side of shield 24, either completely, or substantially covering the entirely of a major surface of the shield, to form a composite, monolithic embodiment. A combined average transmission characteristic of less than five percent across the visible spectrum, and more desirably, of less than three percent and preferably, of less than two percent, approximating that described by the curves shown in FIGS. 10, 11 and 12, is particularly desirable with this composite, monolithic embodiment.

EXAMPLE 3

Figure 7:
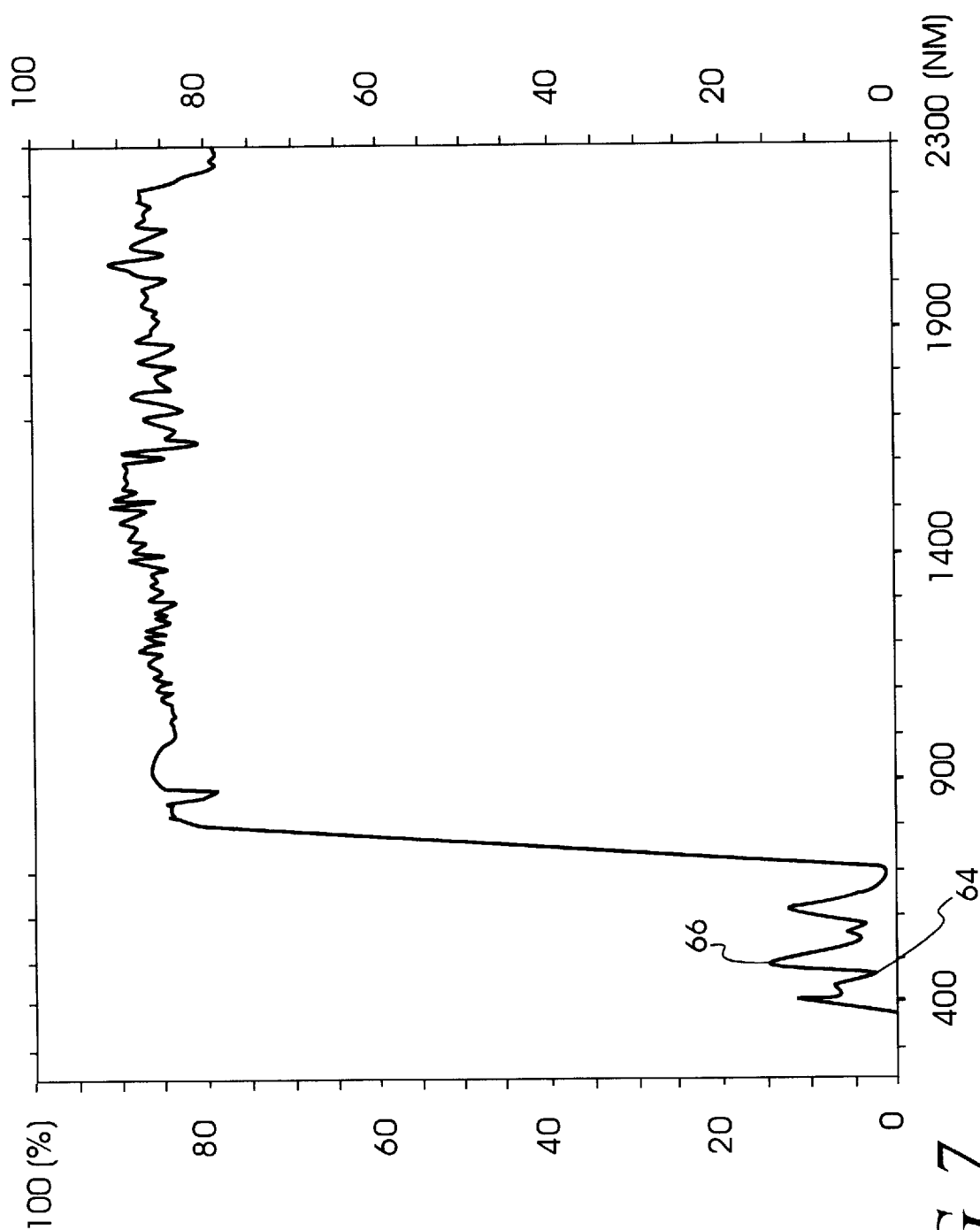
FIG. 7 is a two coordinate graph showing measured values of light transmission as a function of wavelength for one example of a preferred embodiment constructed with a dyed polyester film according to the principles of the present invention.
Figure 8:
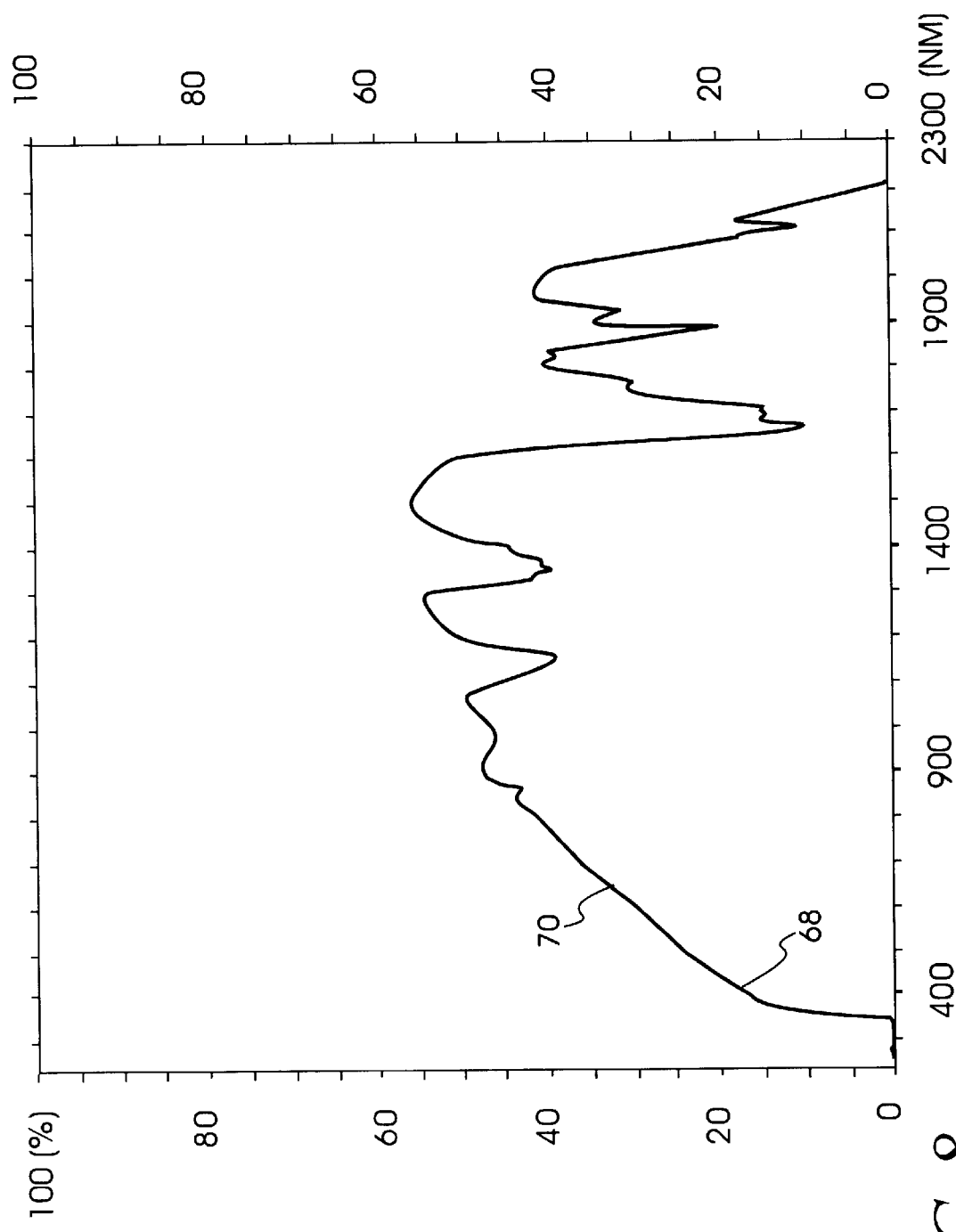
FIG. 8 is a two coordinate graph showing measured values of light transmission as a function of wavelength for one example of a tinted sheet of an acrylic plastic for use with a dark film in accordance with the principles of the present invention.
Figure 9:
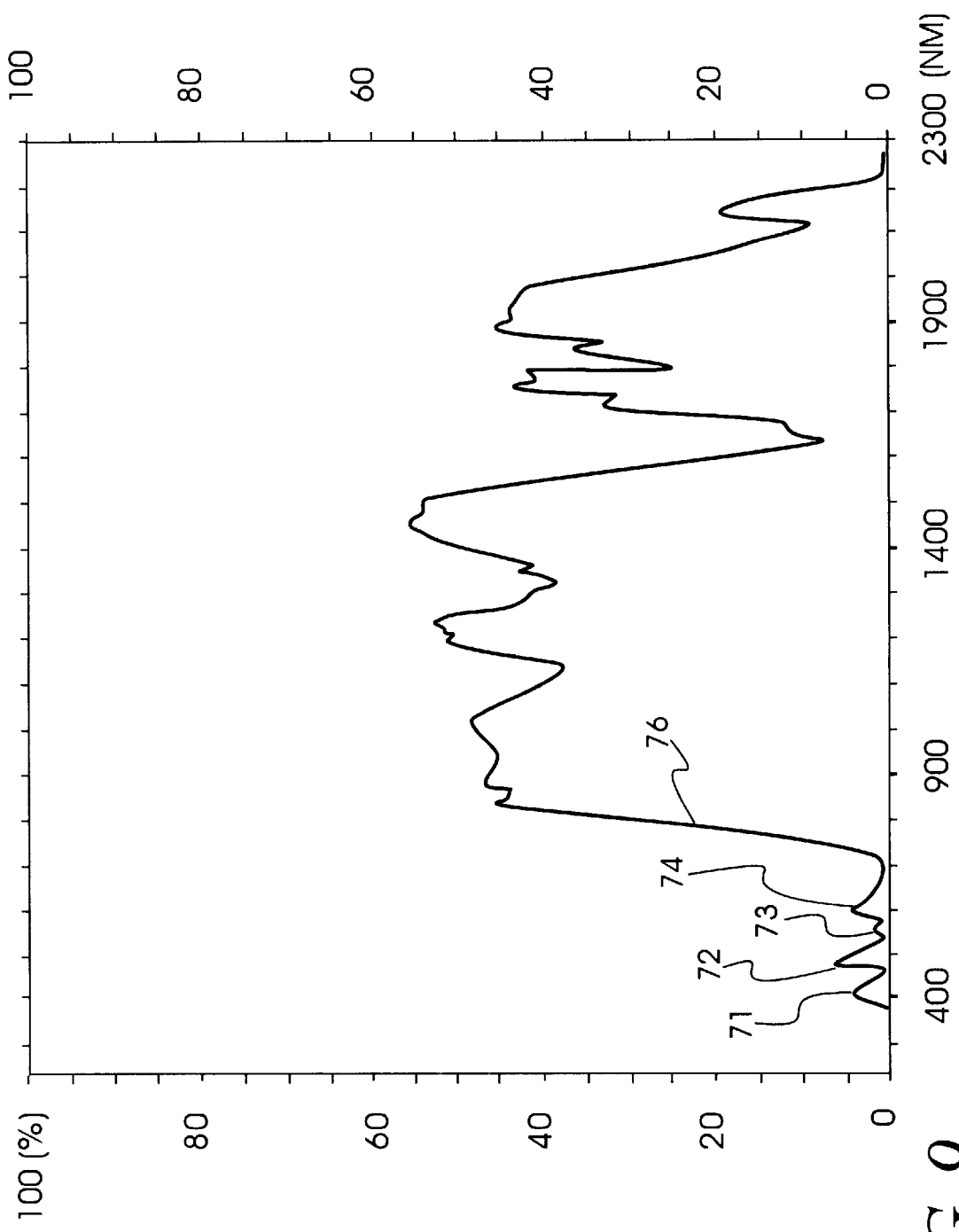
FIG. 9 is a two coordinate spectrophotometer graph showing measured values of light transmission as a function of wavelength for one example of a composite of the film represented in FIG. 7 and the acrylic plastic represented by FIG. 8 combined into a single monolithic structure according to the principles of the present invention.

A particularly preferred film for use in the present invention is a dyed polyester window film purported to be the darkest auto tint on the market and sold under the name LLumar® AT-5 SPS Auto Film, manufactured by Martin Processing, Inc. and, according to S. M. Aharoni, et al. in U.S. Pat. Nos. 5,139,879, 5,178,955 and 5,225,244 respectively for *Fluoropolymer Blend* and *Polymeric Anti-Reflective Coatings And Coated Articles,* by All Purpose Glass Goating Co., of Clifton, N.J. Shield 24 and film 22 should have a homogeneous generally dark gray or black colored appearance, at least in combination, indicating that all wavelengths of light across the visible spectrum are substantially and uniformly absorbed or reflected. In the case of a combination of two materials meeting the requirements of the present invention, whose transmission characteristics are illustrated in FIGS. 7, 8 and 9, a slight bluish-grey cast of the film alone is compensated by the addition of a bronze acrylic having higher transmission of red wavelengths, resulting in an overall reddish-grey appearance of the sun guard 10 itself. Such minor color emphasis does not seem to appreciably alter the visual appearance of objects viewed through the sun guard or to negate the desired glare elimination.

FIG. 7 is a spectrophotometer graph extending over the ultraviolet, visible and infrared spectrum, showing the percentage of light transmitted through LLumar® AT-5 SPS film. Wavelengths shown in the graph above 700 nanometers, referred to as near infrared, and below 400 nanometers, referred to as ultraviolet, are generally not visible to the human eye. Infrared radiation is strongly absorbed by glass used to construct automobile windshields. It is highly desirable however, that transmission through guard 20 of substantially all shorter wavelength ultraviolet radiation, having a concomitant higher energy level dangerous to living tissue, be cut off sharply to 1% or less, for example by the preferred film as shown in FIG. 7.

According to the spectrophotometer graph reproduced in FIG. 7, the LLumar® film alone transmits anywhere from a minimum of about three percent of blue-violet light at 450 nanometers 64 to a maximum of about fifteen percent of cyan (blue-green) light at 490 nanometers 66, averaging somewhere between five and ten percent across the visible spectrum. I have found however, that even this relatively low average light transmission remains sufficient to create an uncomfortable glare when an exceedingly bright light source such as the sun must be directly viewed.

The spectrometer graph of FIG. 8, which measuring light transmission for a stock bronze acrylic manufactured by Cyro Industries suitable for use with the LLumar® film, exhibits an average visible light transmission of about twenty-five to thirty percent, slowly rising from fifteen percent transmission of violet light at 400 nanometers 68 to thirty-five percent transmission of red light at 700 nanometers 70. This stock acrylic also contains black carbon dye, but is incapable alone of eliminating blinding glare when the sun is directly in the occupant's line of sight.

The spectrophotometer graph of FIG. 9 illustrates the transmission characteristic measured for an overlapping combination of the film of FIG. 7 and the acrylic shield of FIG. 8. The materials were selected according to the principles of the present invention to have a combined average visible light transmission of not more than five percent across the visible spectrum, and more desirably, of three percent or less than three percent, and preferably, of two percent or less, thereby eliminating sun glare while permitting even lighted signals in the same line of sight as the sun to be distinguished. The transmission characteristic shown in FIG. 9 for the selected film and acrylic combination exhibits an average transmission characteristic of between two and three percent across the visible wavelengths, and exhibits two peaks 72, 74 centered at about 480 nanometers and 600 nanometers, respectively.

EXAMPLE 4

Subtractive mixing can produce a transparent acrylic having a desired color transmission characteristic, typically by adding soluble dyes which absorb or "subtract" a rough range of wavelengths complementary to the color of the dye. FIG. 10 for example, reproduces spectrophotometer results of relative light transmission plotted along the abscissa against wavelength over the visible spectrum along the ordinate, for one embodiment of sun guard 24 prepared with an acrylic plastic mixed with carbon and soluble dyes. A custom tint may be created according to my invention to exhibit a preferred light transmission characteristic which eliminates the blinding glare typically caused when the sun must be directly viewed while still permitting the colors of nearby lighted signals to be distinguished. Average transmission is substantially less than three percent, and is between approximately two to three percent, with a pair of fifty nanometer bandwidth transmission peaks 60 and 62 exhibiting a maximum transmission of substantially four percent and centered at about 480 nanometers and 600 nanometers respectively, may assist the occupant in discerning some blue-green and red-orange wavelengths produced by traffic lights and brake lights. The transmission peaks 60 and 62 maintain a relatively low transmission trough 63 therebetween in order to insure that the stronger central visible bandwidth generated by the sun is adequately attenuated.

Turning again to FIG. 10, in the one preferred embodiment characterized by the two coordinate graph showing the percentage of light transmitted through the sun guard as a function of the wavelength of the light over a visible spectrum extending between 400 and 700 nanometers, black carbon is mixed with acrylic resin to reduce overall light transmission across the visible and near infrared spectrum by about one-half, and an ultraviolet absorber is also added. Carbon and carbon-based compounds are among the few excellent light absorbers. Average visible light transmission is further reduced to substantially less than five percent, and to even less than about three percent across the visible spectrum by the addition of soluble dyes, thereby eliminating sun glare in accordance with my invention and creating transmission peaks 60, 61 separated by a trough 59 and peaks 61 and 62 separated by a trough 63. On the basis of subtractive mixing previously described, red dye absorbs a range of wavelengths roughly corresponding to the complementary color green to form the trough 63 between peaks 60 and 62. Similarly, green and yellow dyes create the outer slopes of peaks 60 and 62 at the red and violet ends of the spectrum, respectively. As in the case of the selected film and acrylic combination represented by the curve plotted in FIG. 9, the transmission characteristic of the custom tinted acrylic plotted by the curve shown in FIG. 10 is substantially less than five percent across the visible spectrum, and is between about two and three percent across the visible wavelengths. The transmission exhibits a local minimum 63 of about one and one-half percent transmission at about 537 nanometers separating two major peaks 60, 62 of slightly less than four percent transmission centered at about 480 nanometers and 600 nanometers, respectively. A minor peak 61 of about two percent transmission is centered at about 415 nanometers, is separated by a local minimum 59 of less than three-quarters of one percent transmission centered at about 445 nanometers.

EXAMPLE 5

Turning now to FIG. 11, a spectrophotometer graph shows a plot of a curve 90 illustrating the transmission characteristics measured for a single layer, unitary and monolithic structure of an shield 20 made of an acrylic plastic, in comparison with the plot of a curve 80 illustrating transmission characteristics measured for a two layer embodiment constructed with an overlapping combination of film 22 and tinted acrylic shield 24 forming a substrate of a single layer of a tinted acrylic plastic. Plot 80 has a minor peak 81 of less than two percent transmission at about 415 nanometers that is separated by a trough 79 of about three-quarters of one percent transmission at about 450 nanometers from a major peak 82 of less than four percent transmission is centered at about 482 nanometers. A second minor peak 84 of about one and three-quarters percent transmission is centered at about 540 nanometers and separates peak 82 from peak 86 of about four percent transmission centered at about 596 nanometers. Below about 460 nanometers and beyond about 630 nanometers, transmission falls to substantially less than two percent, and remains below two percent.

Between 400 and about 460 nanometers, curve 90 has mostly less than two and one-half percent transmission. A major peak 92 (of less than four percent transmission) is centered at about 480 nanometers while a second major peak 96 with transmission of about four percent is centered at about 596 nanometers. Plot 90 has a first local minimum 79 at about 450 nanometers preceding a peak 92 centered at about 480 nanometers, and a second local minimum 94 at about 544 nanometers preceding a peak 96 centered at about 596 nanometers. The materials used to construct this embodiment were selected according to the principles of the present invention to have a combined average visible light transmission of three percent, or less than three percent, and preferably less than two and one-half percent, across the visible spectrum extending between 400 nanometers and 700 nanometers, thereby eliminating sun glare while permitting even lighted signals in the same line of sight as the sun to be distinguished. As represented by curve 90 in FIG. 11, this custom tinted, single layer acrylic sheet exhibits transmission characteristics with an average transmission across the visible spectrum of less than three percent, and of between about two and three percent.

EXAMPLE 6

In FIG. 12, the a spectrophotometer graph shows a plot of a curve 120 illustrating the transmission characteristics measured for a single layer, unitary and monolithic structure of a shield 20 made of an acrylic plastic, together with a plot of a curve 100 illustrating the transmission characteristics of a two layer embodiment constructed with a layer of film 22 forming a planar surface along one major surface of a darkly tinted layer of acrylic plastic 24. Curve 100 has many of the same characteristics of light transmission across the visible spectrum as curve 80 in FIG. 11, with an average transmission of light within the visible spectrum of less than about two percent.

Curve 120 has one major peak 112 of less than one and one-half percent transmission between about 480 and 500 nanometers separated by a local minimum 114 of about three-quarters percent transmission at about 540 nanometers, from a second major peak 116 of slightly more than two and one-tenth percent transmission at about 590 nanometers. Beyond about 615 nanometers, transmission is less than one percent. As represented by curve 120, this custom tinted single layer acrylic sheet exhibits an average transmission across the visible spectrum of substantially less than two percent, and even less than one and one-half percent.

Measurements of the percentage of transmission at the enumerated visible spectrum wavelengths, through a representative specimen of the embodiment represented by curve 120 illustrated by FIG. 12 and through an embodiment represented by curve 100 used as a reference, and the differences in those measured values are set forth in Table 1.

TABLE 1

|  | SPECIMEN | REFERENCE | DIFFERENCE |
|---|---|---|---|
| 400 | 1.14 | 1.29 | 0.15 |
| 410 | 1.96 | 0.96 | −1.00 |
| 420 | 1.79 | 1.17 | −0.62 |
| 430 | 1.40 | 1.06 | −0.34 |
| 440 | 0.89 | 0.74 | −0.15 |
| 450 | 0.70 | 0.90 | 0.20 |
| 460 | 1.74 | 1.12 | −0.62 |
| 470 | 3.52 | 1.20 | −2.32 |
| 480 | 3.64 | 1.40 | −2.24 |
| 490 | 3.04 | 1.42 | −1.62 |
| 500 | 2.65 | 1.41 | −1.24 |
| 510 | 1.96 | 1.18 | −0.78 |
| 520 | 1.32 | 1.01 | −0.31 |
| 530 | 1.42 | 0.83 | −0.59 |
| 540 | 1.74 | 0.79 | −0.95 |
| 550 | 1.57 | 0.86 | −0.71 |
| 560 | 1.28 | 1.15 | −0.13 |
| 570 | 1.79 | 1.48 | −0.31 |
| 580 | 3.19 | 1.87 | −1.32 |
| 590 | 4.04 | 2.18 | −1.86 |
| 600 | 3.75 | 2.04 | −1.71 |
| 610 | 2.82 | 1.43 | −1.39 |
| 620 | 1.84 | 0.80 | −1.04 |
| 630 | 1.33 | 0.48 | −0.85 |

TABLE 1-continued

| | SPECIMEN | REFERENCE | DIFFERENCE |
|---|---|---|---|
| 640 | 0.84 | 0.41 | −0.43 |
| 650 | 0.70 | 0.46 | −0.24 |
| 660 | 0.55 | 0.38 | −0.17 |
| 670 | 0.53 | 0.35 | −0.18 |
| 680 | 0.43 | 0.22 | −0.21 |
| 690 | 0.47 | 0.31 | −0.16 |
| 700 | 0.59 | 0.43 | −0.16 |

Properties measured for brightness, opacity, strength and haze for through a representative specimen of the embodiment represented by curve 120 illustrated by FIG. 12 and through an embodiment represented by curve 100 used as a reference, and the differences in those measured values are listed in Table 2.

TABLE 2

| | SPECIMEN | REFERENCE |
|---|---|---|
| TAPPI Br | 1.33 | 1.06 |
| Bright | 1.79 | 1.06 |
| YI E313 | 16.39 | 14.19 |
| YI D1925 | 23.20 | 21.12 |
| WI E313 | 0.74 | 0.53 |
| WI CIE | −18.08 | −41.85 |
| Opacity: | | 57.39% |
| ISO 105 Gray-Scale | | |
| A05.2 | 2.30 | 2–3 |
| A03 | | 3–4 |
| A04 (E) | 3.72 | 3–4 |
| Strength | | |
| Chromatic @680 | | 112.30% |
| Apparent | | 112.80% |
| SE @ Equal | | 1.16 |
| | | 0.00% |
| Haze | | |
| Sensor TCS | | |
| d/θ° TCS | | |

Measured calorimetric values for the representative specimen of the embodiment represented by curve 120 illustrated by FIG. 12 and through an embodiment represented by curve 100 used as a reference, and the differences in those measured values are set forth in Table 3.

TABLE 3

| | CALORIMETRIC | | |
|---|---|---|---|
| | Standard | Trial | Differ |
| Red: | 1.6592 | 1.8981 | 0.2389 |
| Green: | 1.6683 | 1.9094 | 0.2412 |
| Blue: | 1.7466 | 1.9765 | 0.2299 |

Values of Status T for red, green and blue for the representative specimen of the embodiment represented by curve 120 illustrated by FIG. 12 and for the embodiment represented by curve 100 used as a reference, and the differences in those measured values are set forth in Table 4.

TABLE 4

| | STATUS T | | |
|---|---|---|---|
| | Standard | Trial | Differ |
| Red: | 1.5486 | 1.8374 | 0.2888 |
| Green: | 1.7735 | 1.9905 | 0.2170 |
| Blue: | 1.6732 | 1.9464 | 0.2732 |

Table 5 gives the measured values of grayness and hue error for the a representative specimen of the embodiment represented by curve 120 illustrated by FIG. 12 and for the embodiment represented by curve 100, and the differences in those measured values.

TABLE 5

| | Standard | Trial | Differ |
|---|---|---|---|
| Grayness: | 87.32 | 92.31 | 4.99 |
| Hue Error: | 55.41 | 71.23 | 15.81 |

The foregoing examples generally describe sun glare shields fabricated with acrylic as a s principal constitute component, in a homogeneous mixture with carbon black and a colorant formed of black, red, green and yellow dyes soluble in the plastic, providing an average electromagnetic transmission across the visible spectrum between 400 nanometers and 700 nanometers of three percent, or less than three percent. The yellow dye is added to the mixture to balance the other dyes. Other materials are contemplated, albeit with somewhat different characteristics, using thin flat plates of both plastic and glass, including acrylics (such as Plexiglas®), polycarbonates (including Lexan®), polymeric plates, polymeric vinyl (including copolymers), styrene, nylon, polyester, and derivated cellulose. The plastic resin forms more than ninety percent by weight of the shield, while the homogeneous mixture forms less than ten percent by weight of the shield.

It should be understood that embodiments described in the detailed description advantageously enhance the ability of an operator to avoid the incredibly harsh, blinding effect of direct sunlight, while maintaining a degree of visibility. One embodiment placed between an operator an the setting sun just above the horizon of the Pacific Ocean on a clear evening, enabled the operator to readily discern the individual ripples on the Ocean, free of the glare of the setting sun. Accordingly, it is contemplated that the practice of these embodiments will extend to not only automotive vehicles, but also to aircraft and watercraft.

While I have shown and described certain present preferred embodiments of the invention and have illustrated certain present preferred methods of constructing and practicing the same, it is to be distinctly understood that the invention as not limited thereto but may be otherwise variously embodied and practiced within the scope of the following claims. For example, several of the embodiments described in the foregoing paragraphs are shown as adjustably mounted adjacent to the driver's side of the windshield of a vehicle such as a passenger automobile, a bus, a highway tractor, an airplane or farm or construction equipment.

I claim:

1. A sun guard, comprising:

a transparent shield made of a single continuous layer of plastic resin, having a major surface movably positionable within a line of sight of an occupant of a vehicle through a windshield of the vehicle, said shield substantially impeding transmission of visible sunlight through said major surface of said shield; and a dark transparent tint uniformly distributed throughout said shield in a mixture with said resin, said mixture transmitting only a minor portion of all visible wavelengths of sunlight impinging upon said shield, said mixture attenuating glare caused by direct transmission of sunlight to the eyes of an occupant of the vehicle when the sun is positioned within said line of sight of an occupant of the vehicle, while permitting the occupant to discern the color of a lighted traffic signal through said mixture while the traffic signal is positioned between the sun and the occupant.

2. The sun guard of claim 1, further comprising said tint and said shield in combination exhibiting less than three percent average light transmission across the visible spectrum through said major surface.

3. The sun guard of claim 1, further comprising said tint and said shield exhibiting between two and three percent average light transmission across the visible spectrum through said major surface of said shield.

4. The sun guard of claim 1, further comprising said tint and said shield in combination exhibiting a transmission characteristic for any wavelength within the visible spectrum no more than three times the average transmission of all wavelengths within the visible spectrum.

5. The sun guard of claim 1, further comprising said tint and said shield emphasizing within said transmission characteristic at least one band of visible wavelengths of light transmitted through said major surface of said shield.

6. A sun guard, comprising
a transparent shield made of a single continuous layer of plastic resin having a major surface movably positionable within a line of sight of an occupant of a vehicle through a windshield of the vehicle, said shield substantially impeding transmission of visible sunlight through said major surface of said shield; and a dark transparent tint uniformly distributed throughout said shield in a mixture with said resin said mixture transmitting only a minor portion of all visible wavelengths of sunlight impinging upon said shield said mixture attenuating glare caused by direct transmission of sunlight to the eyes of an occupant of the vehicle when the sun is positioned within said line of sight of an occupant of the vehicle, while permitting the occupant to discern the color of a lighted traffic signal through said mixture while the traffic signal is positioned between the sun and the occupant;

said tint and said shield exhibiting a transmission characteristic emphasizing two bands of wavelengths centered at about 480 nanometers and 600 nanometers at a level different than visible light between said two bands through said sun guard.

7. The sun guard of claim 1, further comprising said tint and said shield exhibiting light transmission across the visible spectrum through said major surface of said shield.

8. The sun guard of claim 1, further comprising said tint and said shield in combination inhibiting transmission of ultraviolet light to less than one percent of sunlight impingent upon the sun guard within an ultraviolet spectrum.

9. The sun guard of claim 1, further comprising:
a clip forming an integral monolithic structure having opposing flexible surfaces positioned to engage a sun visor attached to a vehicle, said clip having a plurality of extrusions extending from one edge;

a second plurality of extrusions extending from one edge of said shield; and a pivot forming a central axis extending through said first and second plurality of extrusions while pivotally attaching said shield to said clip.

10. The sun guard of claim 1, comprised of:
said plastic resin comprising more than ninety percent by weight of said sun guard; and said tint comprising a homogeneous mixture composed of carbon black and a colorant comprised of black, red, green and yellow dyes soluble in said plastic, said mixture comprising less than ten percent by weight of said sun guard.

11. A sun guard mountable within a vehicle, comprising:
a tinted shield having a single integral and monolithic layer exposing a major surface movably positionable within a line of sight of an occupant of a vehicle through a windshield of the vehicle, said tinted shield comprised of a transparent composition substantially inhibiting direct transmission of sunlight through said materials to less than three percent average transmission across the visible spectrum, enabling a human being separated by said shield from a traffic light to distinguish the color of visual signals emitted by the traffic light when the traffic light is interposed between the sun and said shield.

12. The sun guard of claim 11, further comprising said tinted shield exhibiting a transmission characteristic for any band of wavelengths within the visible spectrum of no more than three times the average visible light transmission.

13. The sun guard of claim 11, further comprising said tinted shield emphasizing within said transmission characteristic at least one band of visible wavelengths of light transmitted through said major surface of said shield.

14. The sun guard mountable within a vehicle, comprising:
a tinted shield having a single integral and monolithic layer exposing a major surface movably positionable within a line of sight of an occupant of a vehicle through a windshield of the vehicle, said tinted shield comprised of a transparent composition substantially inhibiting direct transmission of sunlight through said materials to less than three percent average transmission across the visible spectrum, enabling a human being separated by said shield from a traffic light to distinguish the color of visual signals emitted by the traffic light when the traffic light is interposed between the sun and said shield;

said tinted shield exhibiting a transmission characteristic emphasizing two bands of wavelengths centered at about 480 nanometers and 600 nanometers at a level different than visible light transmitted between said two bands through said sun guard.

15. The sun guard of claim 11, further comprising said tinted shield exhibiting light transmission across the visible spectrum through said major surface of said shield.

16. The sun guard of claim 11, comprised of:
a plastic resin comprising more than ninety percent by weight of said sun guard; and a homogeneous mixture comprised of carbon black and a colorant comprised of black, red, green and yellow dyes soluble in said plastic, said mixture comprising less than ten percent by weight of said sun guard.

17. A sun guard mounted within a vehicle, comprising:
a tinted acrylic shield having a single integral and monolithic layer exposing a major surface movably positionable within a line of sight of an occupant of the vehicle through a windshield of the vehicle, said tinted acrylic shield inhibiting transmission of sunlight impinging on said shield through said major surface across the visible spectrum to less than three percent average transmission.

18. The sun guard of claim 17, further comprising said tinted acrylic shield exhibiting a transmission characteristic emphasizing two bands of wavelengths respectively centered at about 480 nanometers and 600 nanometers at a level approximately twice an average visible light transmission of between two and three percent.

19. The sun guard of claim 17, further comprising said tinted acrylic shield exhibiting between two and three percent average visible light transmission.

20. The sun guard of claim 17, said tinted acrylic shield further comprising a mixture of acrylic; carbon; and red, green, and yellow dyes soluble in a liquid phase of said acrylic.

21. The sun guard of claim 17, comprised of:

a plastic resin comprising more than ninety percent by weight of said sun guard; and a homogeneous mixture comprised of carbon black and a colorant comprised of black, red, green and yellow dyes soluble in said plastic, said mixture comprising less than ten percent by weight of said sun guard.

* * * * *